US007107782B2

(12) United States Patent
Carter

(10) Patent No.: US 7,107,782 B2
(45) Date of Patent: Sep. 19, 2006

(54) EVAPORATIVE HEAT EXCHANGER AND METHOD

(75) Inventor: Thomas P. Carter, Olney, MD (US)

(73) Assignee: Baltimore Aircoil Company, Inc., Jessup, MD (US)

( * ) Notice: Subject to any disclaimer, the term of this patent is extended or adjusted under 35 U.S.C. 154(b) by 304 days.

(21) Appl. No.: 10/888,844

(22) Filed: Jul. 12, 2004

(65) Prior Publication Data

US 2006/0005563 A1    Jan. 12, 2006

(51) Int. Cl.
*F28D 5/00* (2006.01)
(52) U.S. Cl. .................. 62/310; 62/305; 62/309; 165/285; 165/299
(58) Field of Classification Search .............. 62/310, 62/305, 309; 165/285, 299, 110
See application file for complete search history.

(56) References Cited

U.S. PATENT DOCUMENTS

| 5,435,382 | A | | 7/1995 | Carter | |
|---|---|---|---|---|---|
| 5,724,828 | A | | 3/1998 | Korenic | |
| 6,142,219 | A | * | 11/2000 | Korenic et al. | ............. 165/110 |
| 6,385,987 | B1 | * | 5/2002 | Schlom et al. | ................ 62/304 |
| 6,523,604 | B1 | * | 2/2003 | Brooks et al. | ............. 165/110 |
| 6,564,864 | B1 | * | 5/2003 | Carter et al. | ................ 165/285 |
| 2002/0195729 | A1 | | 12/2002 | Merrill et al. | |

\* cited by examiner

*Primary Examiner*—Melvin Jones
(74) *Attorney, Agent, or Firm*—Edward J. Brosius

(57) ABSTRACT

The heat exchange apparatus and method is provided with an indirect evaporative heat exchange section and a direct evaporative heat exchange section. An evaporative liquid is sprayed downwardly into the direct evaporative section to directly exchange heat from the evaporative liquid flowing across fill sheets. The evaporative liquid is then collected in a re-spray tray. The collected evaporative liquid is then sprayed onto an indirect evaporative heat exchange section to indirectly exchange sensible heat from a fluid stream flowing within a series of enclosed circuits comprising the indirect evaporative heat exchange section.

26 Claims, 4 Drawing Sheets

EVAPORATIVE HEAT EXCHANGER AND METHOD

BACKGROUND OF THE INVENTION

The present invention relates to a heat exchanger and a method of exchanging heat and, more particularly, to an evaporative heat transfer apparatus comprising a direct evaporative heat exchange section and an indirect evaporative heat exchange section.

Evaporative heat transfer units comprising both direct and indirect heat transfer sections are disclosed in U.S. Pat. No. 5,435,382. This patent discloses a design that allows the collection of the evaporative liquid from the direct evaporative section and then pumping it upwardly to redistribute it over the indirect evaporative section. Two limitations exist with the prior art described in this patent. First, the evaporative fluid must be pumped upwardly from the collection basin located below the direct evaporative section for distribution over the indirect evaporative section. This means the indirect evaporative section must be located in the upper section of the heat exchange apparatus. While this arrangement provides benefits for accessibility of the indirect section after installation, it puts additional requirements on the apparatus structure to support the mass of the indirect section at higher elevations. Secondly, when desiring to maximize the thermal capability per apparatus plan area, the plan area occupied by the indirect heat transfer section subtracts from the plan area of the apparatus available for the vertical flow of the hot discharge air. The total apparatus airflow must then pass through this remaining smaller net discharge plan area. The air moving device size may also be smaller than optimum due to the reduced size of the net discharge plan area. Due to the need for both the indirect heat transfer section plan area and the net discharge plan area to occupy separate portions of the total apparatus plan area, neither area can be made as large as desired.

A combined direct and indirect heat exchange apparatus is disclosed with the direct section located above the indirect section in U.S. Pat. No. 5,724,828. However, there still exists a problem with maintaining consistent and uniform spray water flow over the indirect section. No provision is made to account for the pull in of the evaporative liquid due to the horizontal flow of the inlet air stream. As the air moves into the unit, it pulls the outer edges of the evaporative liquid falling from the bottom of the direct section inwardly causing the effective wetted plan area available for the indirect section to be smaller than the plan area of the direct section overhead. Additionally, since the falling water is not pulled in uniformly over the entire plan area nor is the pull in consistent with varying fan power levels, the resulting water spray over the indirect section is not uniform. This distracts from the optimum performance that could be achieved with uniform distribution of the evaporative liquid over the entire indirect heat transfer section.

U.S. Pat. No. 6,598,862 discloses a combined indirect and direct heat exchange apparatus wherein the indirect section is of smaller plan area than the direct evaporative section located above it. This application teaches that higher performance is achieved by not allowing any airflow through the indirect section and discounts the additive performance effect of this additional evaporative surface. This limits the size and capacity of the indirect section that can be used in a given plan area. As with other prior art designs, performance also suffers due to the inconsistent and non-uniform spray water loading at the top of the indirect evaporative section. Furthermore, this design teaches to accelerate the velocity of the falling evaporative liquid to at least 9.5 feet per second and up to 15 feet per second. The claimed purpose of these higher velocities is to improve the heat transfer coefficient of the falling evaporative liquid film over the outside surface of the coil. What impact, if any, this higher velocity liquid may have is limited to the top surface of the coil only. Once the liquid hits the top surface, the flow energy is dissipated and the flow through the rest of the coil is the same as it would be if the evaporative liquid had an initial velocity of zero.

SUMMARY OF THE INVENTION

Accordingly, it is an object of the present invention to provide an improved heat exchange apparatus and method including a direct evaporative heat exchange section and an indirect evaporative heat exchange section.

It is also an object of the present invention to provide a heat exchange apparatus and method including a direct evaporative heat exchange section above an indirect evaporative heat exchange section, wherein an intermediate collection of evaporative fluid is provided above the indirect evaporative section and wherein such collected fluid is re-sprayed onto the indirect evaporative section.

The heat exchange system of the present invention utilizing the direct evaporative heat exchange section above the indirect evaporative heat exchange section is combined with a unique air inlet system between the direct heat exchange section and the indirect heat exchange section. Further, a central core exhaust is provided such that a duct is formed in the interior of the heat exchange unit to allow air drawn inwardly and downwardly across the indirect heat exchange section to exhaust into the air duct and upwardly and out of the heat exchange unit.

Further, improved performance of the heat exchange unit of the present invention is provided with the utilization of a re-spray collection tray beneath the direct heat exchange section. The re-spray tray collects evaporative liquid that flows downwardly and through the direct heat exchange section. The re-spray tray then is configured to redistribute the evaporative liquid to a plurality of re-spray nozzles so as to provide a generally uniform spray of evaporative liquid downwardly onto and across the indirect heat exchange section. The provision of evaporative liquid from the re-spray nozzles provides a uniform and consistent supply of evaporative liquid across the indirect section and promotes more uniform circuit to circuit heat transfer within the entire indirect section.

The indirect section itself is made up of a plurality of fluid filled coils that exchange heat in an indirect transfer to the liquid flowing across the outside of the coils. Further the plan area of the indirect heat exchange section can be optimally sized to maximize the capacity of the entire heat exchange apparatus. It is generally preferred that the plan area of the indirect heat exchange section would substantially equal the plan area of the direct heat exchange section.

Further, the re-spray collection tray is located in a neutral area of the inlet plenum between the direct and indirect heat exchange sections and does not interfere with the natural streamlines of inlet air. Since the downward flow of sprayed evaporative liquid is eliminated in the region between the bottom of the re-spray tray and the top of the re-spray distribution branches, the air inlet pressure drop into the indirect section is further reduced. This dry area also permits easy inspection and maintenance of the re-spray nozzles during the operation of the heat exchange apparatus.

The central exhaust duct, in addition to providing an upward pathway for the hot discharge air exiting the indirect heat exchange section, also provides a unique internal access to service the fan drive system and the evaporative spray distribution system for the direct heat exchange section.

BRIEF DESCRIPTION OF THE DRAWINGS

Referring to the drawings.

DESCRIPTION OF THE PREFERRED EMBODIMENT

Figure 1:
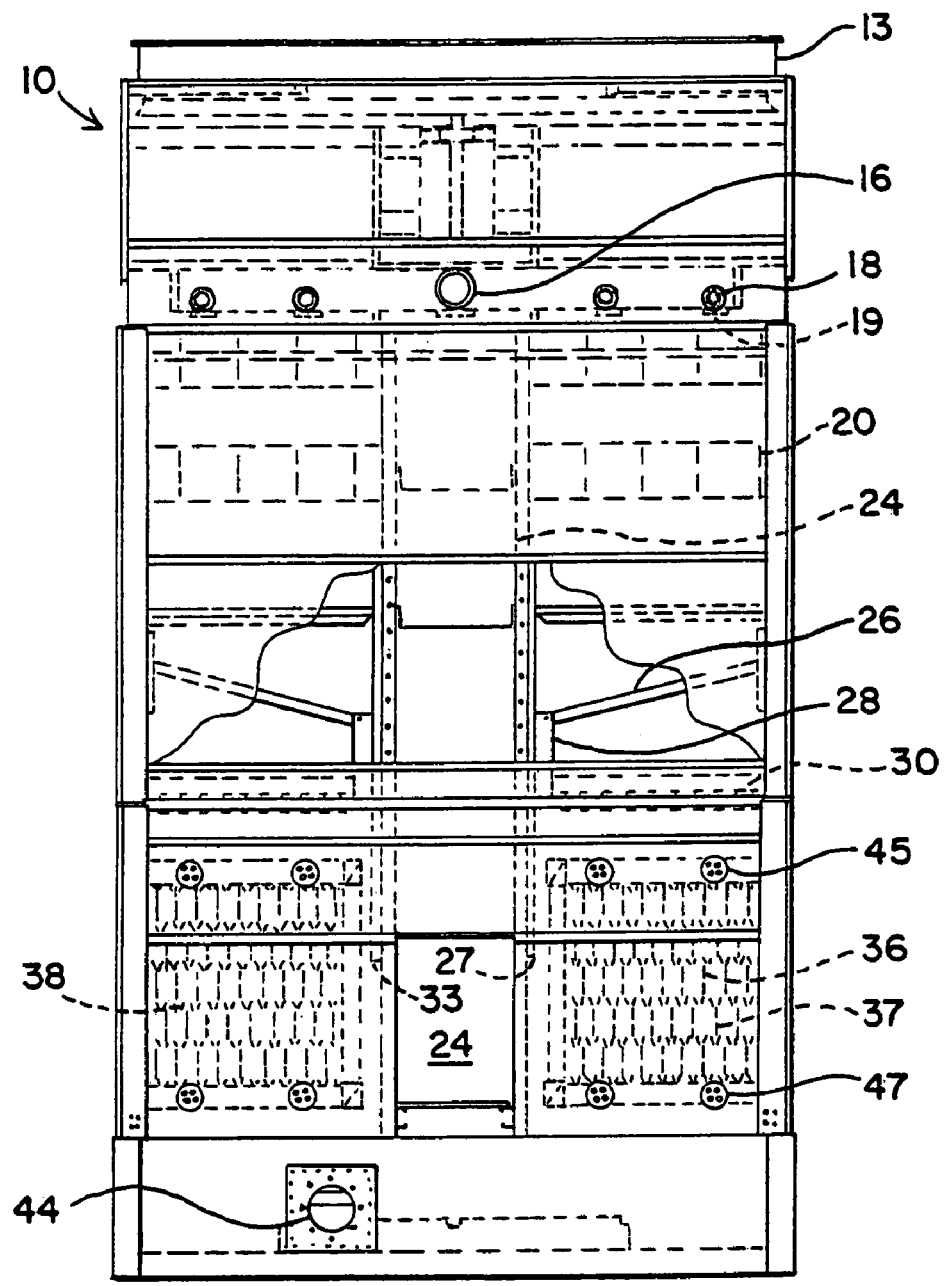
FIG. 1 is a side elevation view, in partial cross-section, of the heat exchange apparatus in accordance with the present invention.
Figure 3:
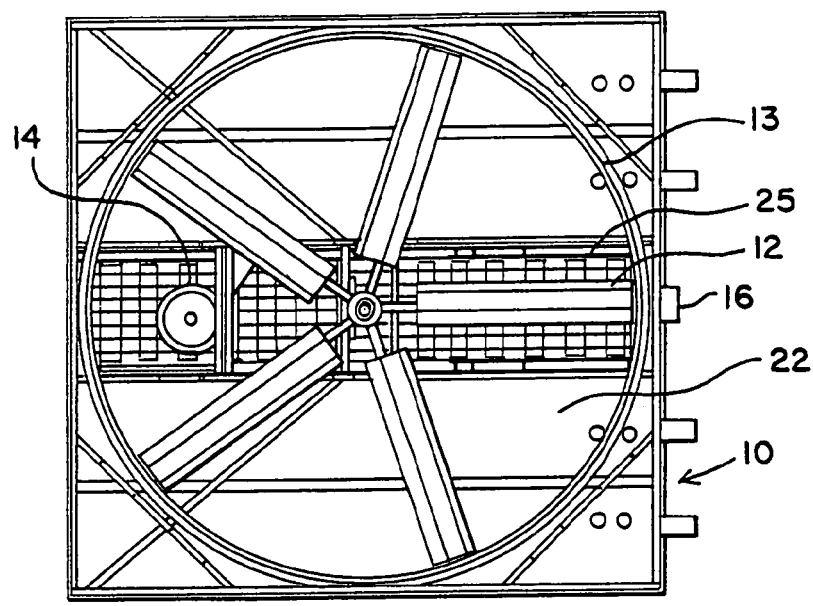
FIG. 3 is a top plan view of a heat exchange apparatus in accordance with the present invention.

Referring now to FIGS. 1–5, a heat exchanger in accordance with the present invention is shown generally at 10. It should be known that such heat exchangers are usually comprised of sheet metal, with appropriate internal structural elements. Fan 12 is seen to be structurally mounted on supports at the top of heat exchanger 10. Fan 12 is shown as a blade or propeller fan, and it should be understood that a plurality of smaller diameter fans could be located at the top of heat exchanger 10 in individual exhaust plenums. Fan motor 14 drives fan 12 by a belt or gear drive assembly. Typically, exhaust plenum 13 is made of formed fiberglass or shaped sheet metal. Evaporative liquid inlet 16 is shown as a tube, which is usually a polyvinyl chloride pipe. Evaporative liquid inlet 16 has a plurality of evaporative liquid upper spray branches 18 operatively connected thereto such that evaporative liquid is distributed throughout evaporative liquid upper spray branches 18. A plurality of upper liquid spray nozzles 19 extend downwardly from each of evaporative upper spray branches 18 such that a spray of evaporative liquid is provided downwardly onto the top of direct evaporative section 20.

Direct evaporative section 20 is comprised of a plurality of fill sheets 22. Each fill sheet is typically a thin sheet of polyvinyl chloride or other plastic either structurally supported or hung from appropriate structure. There are numerous such fill sheets 22 in a heat exchange apparatus 10, with appropriate spacing to allow evaporative liquid to run downwardly across the fill sheets while air is drawn upwardly by fan 12 through direct evaporative section air inlet 32.

Figure 2:
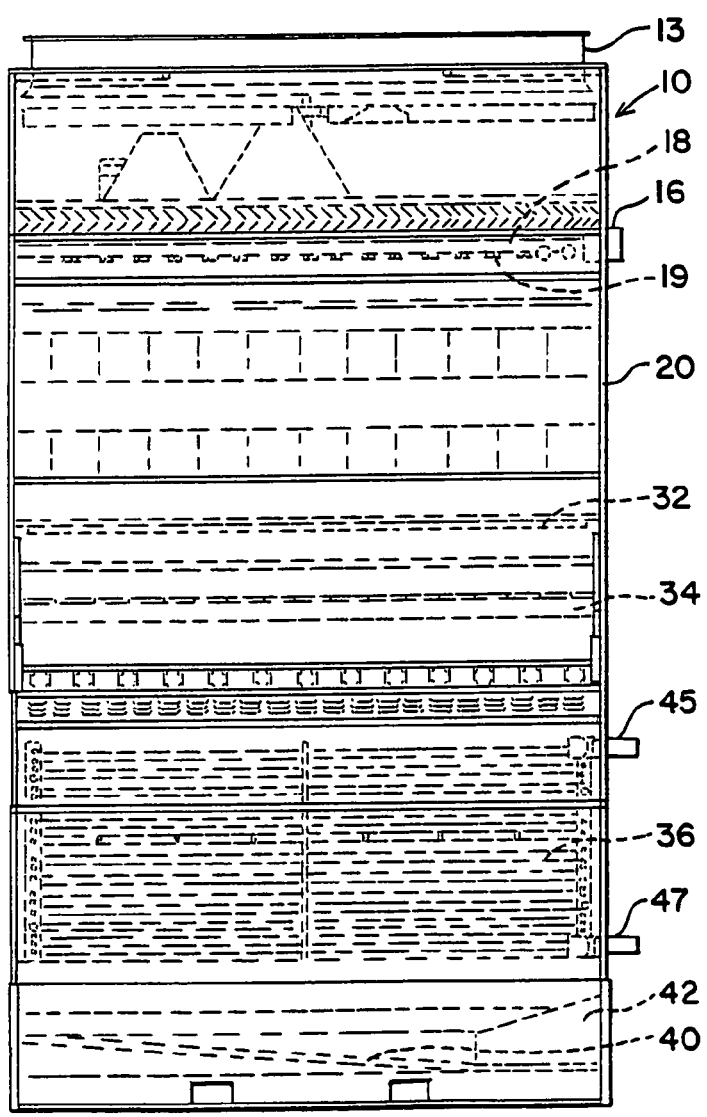
FIG. 2 is a front elevation view of a heat exchange apparatus in accordance with the present invention.
Figure 4:
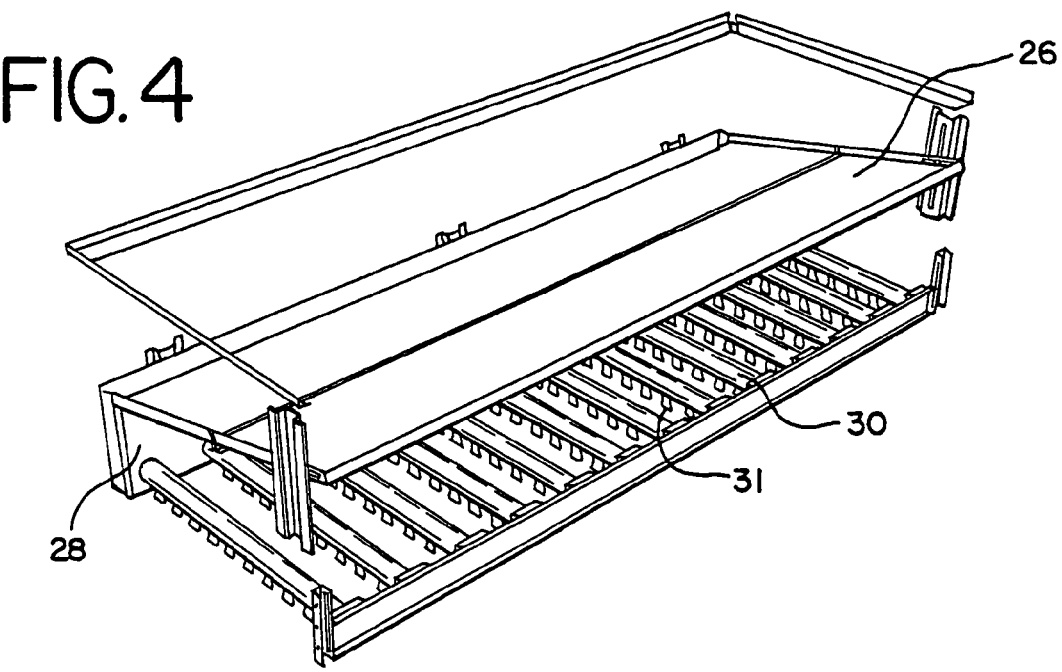
FIG. 4 is a detail perspective view of the re-spray trough and branch system in accordance with the present invention.
Figure 5:
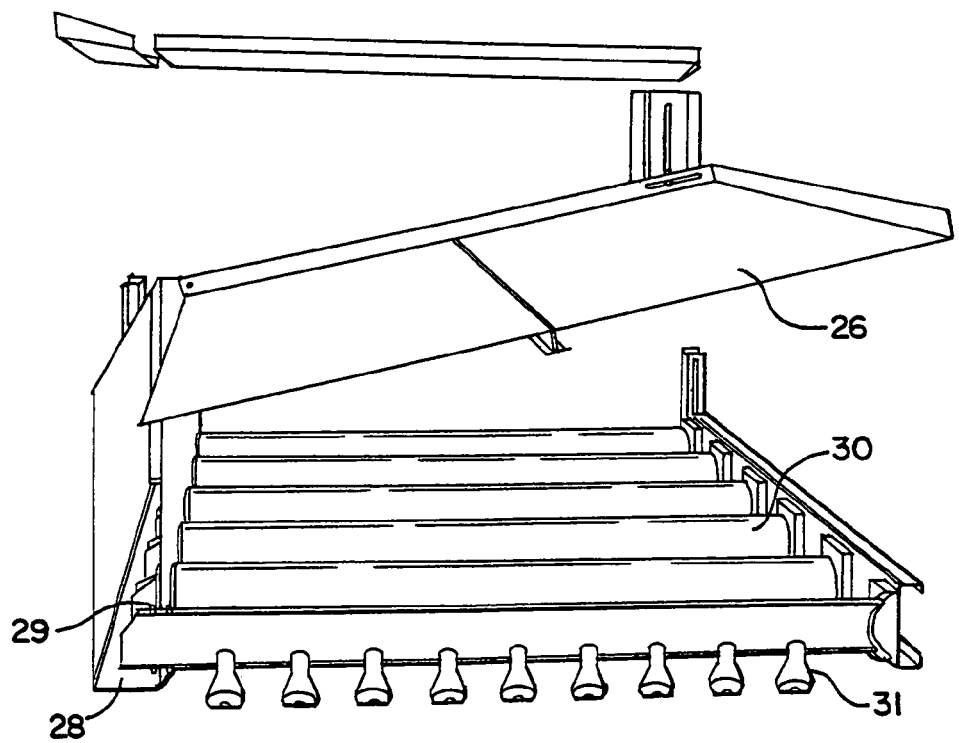
FIG. 5 is an end view, in cross section, of the re-spray trough and branch system in accordance with the present invention.

Direct evaporative section air inlet 32 is seen to extend across the front, as shown in FIG. 2 and also across the back, not shown, faces of heat exchanger 10. Direct evaporative section air inlet 32 is basically an open space to allow air to be drawn generally crossways into heat exchanger 10 and then generally upwardly through direct evaporative section 20. It is seen that the airflow upwardly through direct evaporative section 20 is countercurrent to the downward flow of evaporative liquid from upper liquid spray nozzles 19.

Evaporative liquid falling downwardly and exiting direct evaporative section 20 is collected on re-spray tray 26. Re-spray tray 26 is shown in detail in FIGS. 4 and 5, and is seen to comprise a generally flat, generally rectangular metallic structure or even structural plastic configuration or material. Re-spray tray 26 is seen to extend and block the entire structure below direct evaporative section 20 such that virtually all evaporative liquid exiting direct evaporative section 20 is collected on re-spray tray 26.

The collected evaporative liquid on re-spray tray 26 is seen to run due to the incline of re-spray tray 26 into re-spray trough 28. Re-spray trough 28 is typically a structurally shaped metallic structure or is comprised of structural plastic. Re-spray branches 30 are seen to be operatively connected to re-spray trough 28 such that evaporative liquid may enter re-spray branch inlets 29 and be distributed across the entire length of re-spray branches 30. This allows the liquid to be distributed to the plurality of re-spray nozzles 31 that protrude from each of re-spray branches 30. Accordingly, there is a virtual dry zone between re-spray tray 26 and re-spray branches 30.

Evaporative liquid exiting re-spray nozzles 31 are seen to be evenly and uniformly distributed across the top of first indirect evaporative section 36, as well as second indirect evaporative section 38, considering the dual structure of heat exchange apparatus 10. It is conceivable that only a single first direct evaporative section 20 and indirect evaporative section 36 could be utilized in a structure in accordance with the present invention.

Indirect evaporative section air inlet 34 is seen to be an opening extending across the front, and, not shown, rear face of heat exchanger 10. Accordingly, air is drawn into indirect evaporative section air inlet 34, downwardly across indirect evaporative section 36 and out the bottom and part of the open side into center duct 24. The structural sides of center duct 24 are seen to end at 27, thereby allowing air drawn into indirect evaporative section air inlet 34 to proceed generally downwardly across first indirect evaporative section 36 and outwardly into and across into center duct 24. Similarly, air is drawn through indirect evaporative section air inlet on the rear face of heat exchanger 10 downwardly and across second indirect evaporative section 38 and into center duct 24. Similarly, the structural opening into center duct 24 from second indirect evaporative section 38 is shown at 33.

Indirect section process fluid inlet 47 is seen to be a pipe structure, typically comprised of a metal, usually steel, pipe, whereby process fluid is inlet into a header and into each indirect evaporative section 37 circuit tube of coil 36. A similar arrangement is present at second indirect evaporative section 38. Indirect section process fluid outlet 45 is seen to also be connected to a header arrangement whereby the end or top of each indirect section circuit tube 37 is extended to thereby provide an outlet for the cold process fluid. For operation as a condenser, the flow in the indirect section would be reversed, with a vapor entering the upper inlet and the condensed refrigerant leaving the bottom outlet.

Evaporative liquid which exits first indirect evaporative section 36 and second indirect evaporative section 38 is seen to be collected in evaporative liquid collection pan 40. Such collection pan is typically a metal structural arrangement at the bottom of heat exchanger 10. Such evaporative liquid is allowed to accumulate in pump section 42, whereby it is pumped through evaporative liquid outlet 44, and back up to the evaporative liquid inlet 16.

Figure 6:
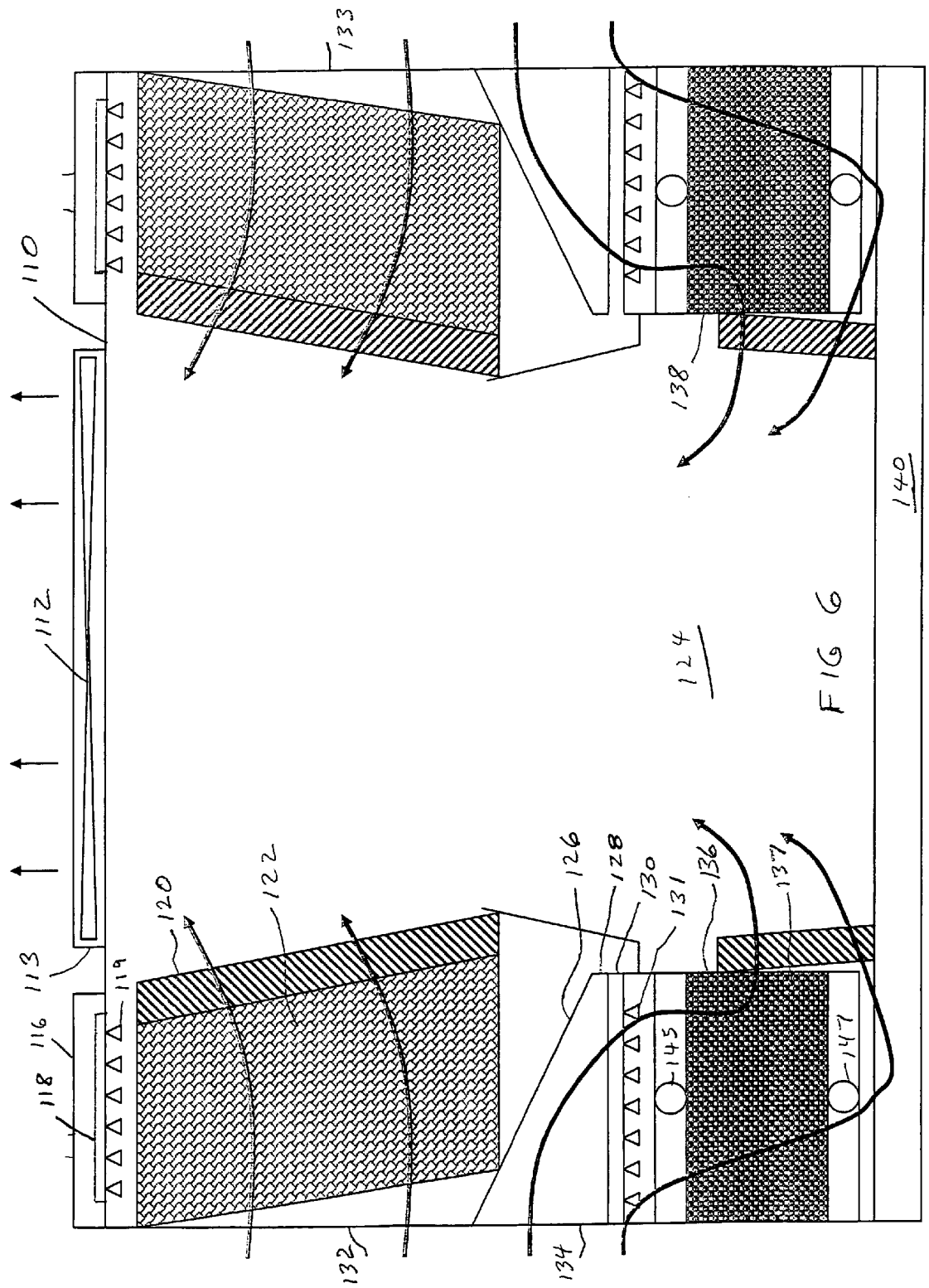
FIG. 6 is a side elevational view, in partial cross section, of a second embodiment of the heat exchanger apparatus of the present invention.

Referring now to FIG. 6, a heat exchanger in accordance with a second embodiment of the present invention is shown generally at 110. This embodiment is typically referred to as a crossflow arrangement, with a central fan 112 and two side areas of heat exchange elements. It should be known that such heat exchangers are usually comprised of sheet metal, with appropriate internal structural elements. Fan 112 is seen to be structurally mounted on supports at the top of the heat exchanger 110. Fan 112 is shown as a blade or propeller fan, and it should be understood that a plurality of smaller diameter fans could be located at the top of heat exchanger 110 in individual exhaust plenums. A fan motor drives fan 112 by a belt or gear drive assembly. Typically, exhaust plenum 113 is made of formed fiberglass or shaped sheet metal. Evaporative liquid inlet 116 is shown. A redistribution box provides for a uniform level of evaporative liquid in the upper distribution pan. Gravity spray nozzles, 119, located in the base of the upper pan distribute the evaporative liquid uniformly across the top of the direct evaporative section such that a spray of evaporative liquid is provided downwardly onto the top of direct evaporative section 120.

Direct evaporative section 120 is comprised of a plurality of fill sheets 122. Each fill sheet is typically a thin sheet of PVC or other plastic either structurally supported or hung from appropriate structure. There are numerous such fill sheets 122 in a heat exchange apparatus 110, with appropriate spacing to allow evaporative liquid to run downwardly across the fill sheets while air is drawn across by fan 112 through direct evaporative section air inlet 132.

Direct evaporative section air inlet 132 is seen to extend across the front with air inlet 133 extending across the back of heat exchanger 110. Direct evaporative section air inlet 132 is basically an open face to allow air to be drawn generally crossways into heat exchanger 110 and then generally across direct evaporative section 120. It is seen that the airflow across direct evaporative section 120 is cross-current to the downward flow of evaporative liquid from upper liquid spray nozzles 119.

Evaporative liquid falling downwardly from and exiting direct evaporative section 120 is collected on re-spray tray 126. Re-spray tray 126 is seen to comprise a generally flat, generally rectangular metallic structure or is comprised of structural plastic. Re-spray tray 126 is seen to extend and block the entire structure below direct evaporative section 120 such that virtually all evaporative liquid exiting direct evaporative section 120 is collected on re-spray tray 126.

The collected evaporative liquid on re-spray tray 126 is seen to run due to the incline of re-spray tray 126 into re-spray trough 128. Re-spray trough 128 is typically a structurally shaped metallic structure or is comprised of structural plastic. Re-spray branches 130 are seen to be operatively connected to re-spray trough 128 such that evaporative liquid may be distributed across the entire length of re-spray branches 130. This allows the liquid to be distributed to the plurality of re-spray nozzles 131 that protrude from each of re-spray branches 130. Accordingly, there is a virtual dry zone between re-spray tray 126 and re-spray branches 130.

Evaporative liquid exiting re-spray nozzles 131 are seen to be evenly and uniformly distributed across the top of indirect evaporative section 136. It is conceivable that only a single first direct evaporative section 120 and indirect evaporative section 136 could be utilized in a structure in accordance with the present invention.

Indirect evaporative section air inlet 134 is seen to be an opening extending across the front, with a similar opening at the rear face of exchanger 110. Accordingly, air is drawn into indirect evaporative section air inlet 134, downwardly across indirect evaporative section 136 and out the bottom and part of the open side into center section 124. Similarly, air is drawn through indirect evaporative section air inlet on the rear face of heat exchanger 110 across second indirect evaporative section 138 and into center section 124.

Indirect section process fluid inlet 147 is seen to be a pipe structure, typically comprised of a metal, usually steel, pipe, whereby process fluid is inlet into a header and into each indirect evaporative section 137 circuit tube of coil 136. A similar arrangement is present at second indirect evaporative section 138. Indirect section process fluid outlet 145 is seen to also be connected to a header arrangement whereby the end or top of each indirect section circuit tube 137 is extended to thereby provide an outlet for the cold process fluid. For operation as a condenser, the flow in the indirect section would be reversed, with a vapor entering the upper inlet and the condensed refrigerant leaving the bottom outlet.

Evaporative liquid which exits first indirect evaporative section 136 and second indirect evaporative section 138 is seen to be collected in evaporative liquid collection pan 140. Such collection pan is typically a metal structural arrangement at the bottom of heat exchanger 110. Such evaporative liquid is allowed to accumulate in a sump section, whereby it is pumped through an evaporative liquid outlet back up to the evaporative liquid inlet 116.

What is claimed is:

1. A method of exchanging heat comprising the steps of providing a heat exchange apparatus having a direct evaporative section and an indirect evaporative section, the direct evaporative section comprising a plurality of fill elements, the indirect section comprising a plurality of individual circuits each conducting a fluid stream, spraying an evaporative liquid generally downwardly across the direct evaporative section, moving air generally countercurrent to the spray of evaporative liquid generally upwardly across the direct evaporative section such that heat is exchanged from the evaporative liquid to the air moving across the direct evaporative section, collecting the evaporative liquid that passes through the direct evaporative section in a re-spray tray, passing the collected evaporative liquid through a plurality of re-spray branches each having a plurality of re-spray nozzles, such that the collected evaporated liquid is sprayed generally downwardly across the indirect evaporative section, and moving air generally concurrent with the spray of evaporative liquid across the indirect evaporative section, such that heat is exchanged from the fluid stream in the individual circuits of the indirect evaporative section to the evaporative liquid and to the air moving across the indirect evaporative section.

2. The method of claim 1 further comprising the steps of providing air inlets below the direct evaporative section on opposite outside walls of the heat exchange apparatus such that air is drawn in through the air inlets to flow generally upwardly across the direct evaporative section.

3. The method of claim 1 further comprising the steps of providing air inlets above the indirect evaporative section on opposite outside walls of the heat exchange apparatus such that air is drawn in through the air inlets to flow generally downwardly across the indirect evaporative section.

4. The method of claim 3
further comprising the steps of
providing an air outlet duct within the heat exchange apparatus such that air flow across the indirect section is generally downwardly and crosscurrent to enter the air outlet duct from an inner side of the indirect section.

5. The method of claim 1
further comprising the steps of
collecting substantially all of the evaporative liquid that passes through the direct evaporative section in the re-spray tray, and spraying substantially all of the collected evaporative liquid across the indirect evaporative section.

6. The method of claim 1
further comprising the steps of
collecting substantially all of the evaporative liquid that passes through the indirect evaporative section in a collection sump and pumping substantially all of such collected evaporative liquid upwardly to be distributed and sprayed generally downwardly across the direct evaporative section.

7. The method of claim 1
wherein the collected evaporative liquid from the re-spray tray is sprayed from the re-spray nozzles in a generally uniform pattern across a top portion of the indirect evaporative section such that substantially all of the top portion of the indirect evaporative section receives a uniform pattern of sprayed evaporative liquid.

8. The method of claim 1, for operation as a condenser
wherein the individual circuits of the indirect evaporative section are arranged such that the fluid in each circuit flows concurrently with the flow of evaporative liquid running generally downwardly across the indirect evaporative section.

9. The method of claim 1, for operation as a fluid cooler,
wherein the individual circuits of the indirect evaporative section are arranged such that the fluid in each circuit flows countercurrent to the flow of evaporative liquid running generally downwardly across the indirect evaporative section.

10. The method of claim 1
wherein the re-spray tray comprises a generally flat, generally rectangular structure, the re-spray tray being inclined downwardly from an outside edge toward an inside edge such that the collected evaporative liquid enters a re-spray trough.

11. The method of claim 10
wherein each of the re-spray branches extends from the re-spray trough.

12. A heat exchange apparatus comprising
a direct evaporative section and an indirect evaporative section, the direct evaporative section positioned above the indirect evaporative section,
an air inlet generally between the direct evaporative section and the indirect evaporative section,
a fan to cause air to be drawn generally from upwardly through the direct evaporative section from the air inlet and generally downwardly through the indirect evaporative section from the air inlet,
a central duct within the heat exchange apparatus, the central duct located to receive the air drawn from the indirect evaporative section and exhaust the air upwardly, the direct evaporative section comprising a plurality of fill elements,
the indirect evaporative section comprising a plurality of individual circuits each conducting a fluid stream,
an inlet and spray arrangement for evaporative fluid positioned above the direct evaporative section such that evaporative fluid is sprayed downwardly onto the direct evaporative section,
a re-spray tray located beneath the direct evaporative section to collect substantially all the evaporative fluid that passes through the direct evaporative section,
a plurality of re-spray branches that receive the evaporative fluid from the re-spray tray, and a plurality of re-spray nozzles in each re-spray branch to spray the evaporative liquid collected from the re-spray tray downwardly onto the indirect evaporative section.

13. The heat exchange apparatus of claim 12
wherein the re-spray tray comprises a generally flat, generally rectangular structure, the tray being inclined downwardly from an outside edge toward an inside edge such that the collected evaporative liquid enters a re-spray trough.

14. The heat exchange apparatus of claim 12
wherein the re-spray branches and re-spray nozzles are arranged in a manner to provide a generally uniform pattern of sprayed evaporative liquid across a top portion of the indirect evaporative section.

15. The heat exchange apparatus of claim 12
wherein the central duct provides access to the fan and to the direct evaporative section.

16. A method of exchanging heat comprising the steps of
providing a heat exchange apparatus having a direct evaporative section and an indirect evaporative section,
the direct evaporative section comprising a plurality of fill sheets, the indirect evaporative section comprising a plurality of circuits each conducting a fluid stream,
spraying an evaporative liquid generally downwardly through the direct evaporative section,
moving air generally upwardly through the direct evaporative section,
collecting the evaporative liquid that passes through the direct evaporative section in a re-spray tray,
spraying the collected evaporative liquid through a plurality of re-spray nozzles downwardly onto the indirect evaporative section,
and moving air generally downwardly across the indirect evaporative section.

17. The method of claim 16 further including
providing an outlet duct to receive air from the indirect evaporative section and exhaust such air from the heat exchange apparatus.

18. The method of claim 17
wherein the outlet duct is adjacent the indirect evaporative section such that the air moves generally downwardly and across the indirect evaporative section.

19. The method of claim 16
further including
providing a re-spray trough to receive the collected evaporative liquid from the re-spray tray, and providing a plurality of re-spray branches extending from the re-spray trough, with the plurality of re-spray nozzles extending from the re-spray branches.

20. The method of claim 16
wherein the re-spray tray comprises a generally flat, generally rectangular structure, the re-spray tray being inclined downwardly toward re-spray trough such that the collected evaporative liquid is provided to a plurality of re-spray branches that extend from the re-spray trough.

21. The method of claim 16
wherein the spray of collected evaporative liquid from the re-spray nozzles is generally uniform across the indirect evaporative section.

22. A method of exchanging heat comprising the steps of
providing a heat exchange apparatus having a direct evaporative section and an indirect evaporative section,
the direct evaporative section comprising a plurality of fill sheets, the indirect evaporative section comprising a plurality of circuits each conducting a fluid stream,
spraying an evaporative liquid generally downwardly through the direct evaporative section,
moving air generally across the direct evaporative section,
collecting the evaporative liquid that passes through the direct evaporative section in a respray tray,
spraying the collected evaporative through a plurality of re-spray nozzles downwardly downwardly onto the indirect evaporative section,
and moving air generally downwardly and across the indirect evaporative section.

23. The method of claim 22
further providing an outlet duct adjacent the indirect evaporative section such that the air moves generally downwardly and across the indirect evaporative section.

24. The method of claim 22
further including
providing a re-spray trough to receive the collected evaporative liquid from the re-spray tray, and providing a plurality of re-spray branches extending from the re-spray trough, with the plurality of re-spray nozzles extending from the re-spray branches.

25. The method of claim 22
wherein the re-spray tray comprises a generally flat, generally rectangular structure, the re-spray tray being inclined downwardly toward a re-spray trough such that the collected evaporative liquid is provided to a plurality of re-spray branches that extend from the re-spray trough.

26. The method of claim 22
wherein the spray of collected evaporative liquid from the re-spray nozzles is generally uniform across the indirect evaporative section.

\* \* \* \* \*

UNITED STATES PATENT AND TRADEMARK OFFICE
CERTIFICATE OF CORRECTION

PATENT NO. : 7,107,782 C1  
APPLICATION NO. : 90/013042  
DATED : August 8, 2014  
INVENTOR(S) : Thomas P. Carter It is certified that error appears in the above-identified patent and that said Letters Patent is hereby corrected as shown below:

Title Page

Item (73) "Assignee: Bank of America, N.A., San Francisco, CA (US)" should read

--Assignee: Baltimore Aircoil Company, Inc., Jessup, MD (US)--.

Signed and Sealed this
Fourteenth Day of October, 2014

Michelle K. Lee
*Deputy Director of the United States Patent and Trademark Office*

(12) EX PARTE REEXAMINATION CERTIFICATE (10250th)

United States Patent
Carter

(10) Number: US 7,107,782 C1
(45) Certificate Issued: Aug. 8, 2014

(54) EVAPORATIVE HEAT EXCHANGER AND METHOD

(75) Inventor: Thomas P. Carter, Olney, MD (US)

(73) Assignee: Bank of America, N.A., San Francisco, CA (US)

Reexamination Request:
No. 90/013,042, Oct. 24, 2013

Reexamination Certificate for:
Patent No.: 7,107,782
Issued: Sep. 19, 2006
Appl. No.: 10/888,844
Filed: Jul. 12, 2004

(51) Int. Cl.
*F28D 5/00* (2006.01)

(52) U.S. Cl.
USPC ............ 62/310; 62/309; 62/305; 165/285; 165/299

(58) Field of Classification Search
None
See application file for complete search history.

(56) References Cited

To view the complete listing of prior art documents cited during the proceeding for Reexamination Control Number 90/013,042, please refer to the USPTO's public Patent Application Information Retrieval (PAIR) system under the Display References tab.

*Primary Examiner* — William Doerrler

(57) ABSTRACT

The heat exchange apparatus and method is provided with an indirect evaporative heat exchange section and a direct evaporative heat exchange section. An evaporative liquid is sprayed downwardly into the direct evaporative section to directly exchange heat from the evaporative liquid flowing across fill sheets. The evaporative liquid is then collected in a re-spray tray. The collected evaporative liquid is then sprayed onto an indirect evaporative heat exchange section to indirectly exchange sensible heat from a fluid stream flowing within a series of enclosed circuits comprising the indirect evaporative heat exchange section.

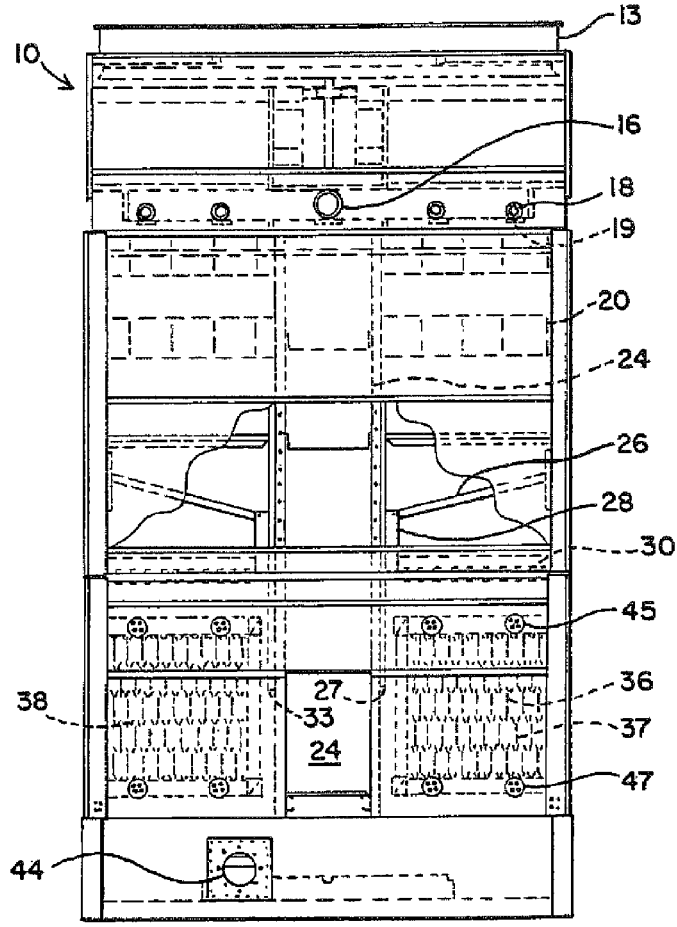

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 16-26 is confirmed.

Claims 1-15 were not reexamined.

\* \* \* \* \*